SIGNAL FREQUENCY AND PHASE SEQUENCED TIME DIVISION MULTIPLEX COMMUNICATION SYSTEM
Filed Jan. 26, 1965
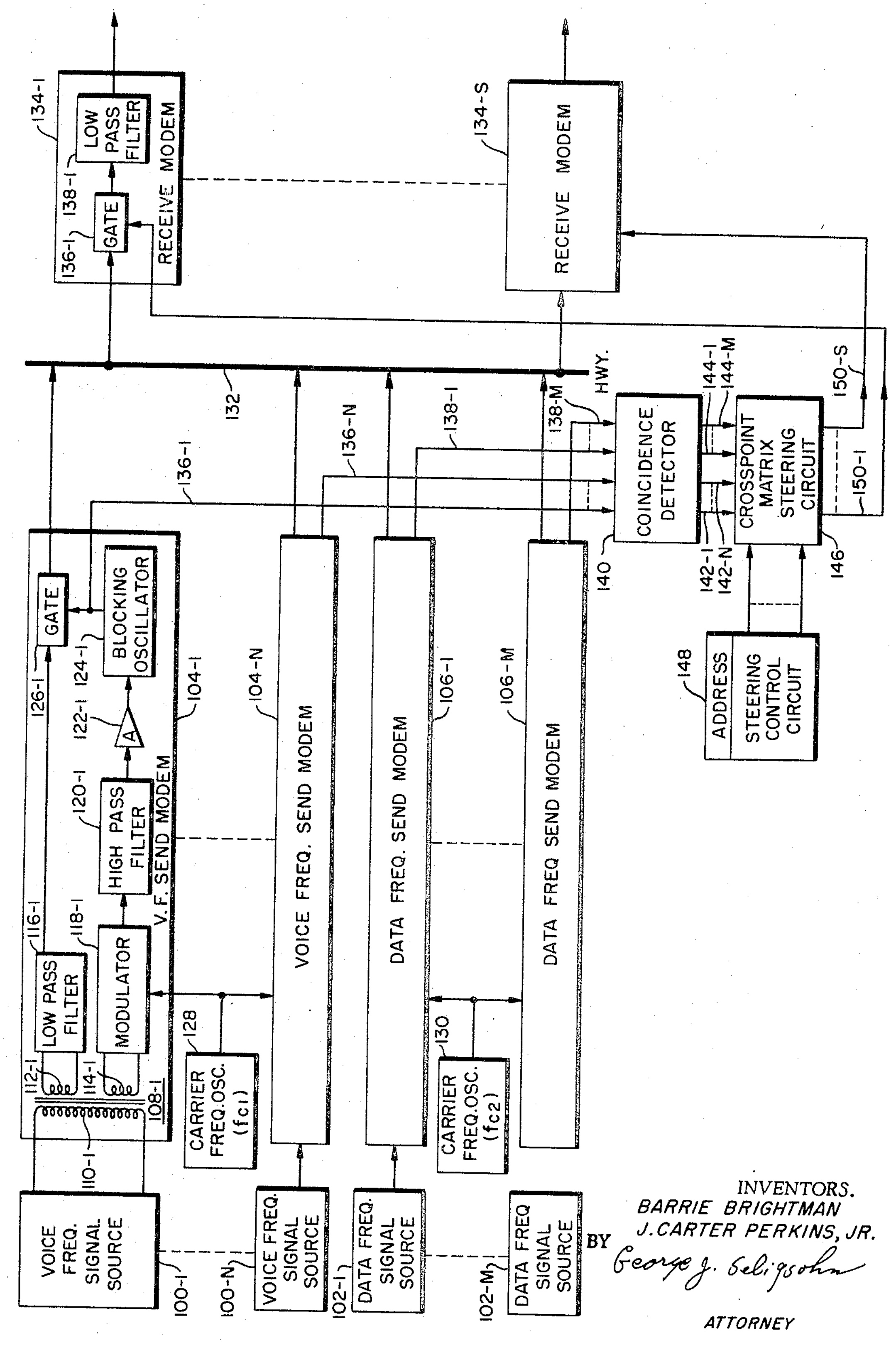
INVENTORS.
BARRIE BRIGHTMAN
J. CARTER PERKINS, JR.
BY George J. Seligsohn
ATTORNEY United States Patent Office 3,340,364

Patented Sept. 5, 1967

3,340,364

SIGNAL FREQUENCY AND PHASE SEQUENCED TIME DIVISION MULTIPLEX COMMUNICATION SYSTEM

Barrie Brightman, Webster, and J. Carter Perkins, Jr., Victor, N.Y., assignors to Stromberg-Carlson Corporation, Rochester, N.Y., a corporation of Delaware Filed Jan. 26, 1965, Ser. No. 428,107
13 Claims. (Cl. 179—15)

This invention relates to a time division multiplex communication system and, more particularly, to such a system which is signal frequency and phase sequenced, i.e., where the time of occurrence of a signal sample is determined by the instantaneous signal frequency and phase of the signal being sampled.

In a conventional time division multiplex communication system, a repetitive time frame is divided into a predetermined number of non-overlapping time slots. A different time slot is allotted to each one of a plurality of simultaneous independent communications carried over a common transmission highway. An individual, normally closed, send gate associated with each comunication has its output coupled to a common transmission highway and an individual, normally closed, receive gate associated with each communication has its input coupled to the common transmission highway. The pair of send and receive gates associated with each particular communication is opened only during the time slot allotted to that communication, whereby amplitude-modulated sample pulses of each communication are transmitted from various analog signal sources which are individually coupled to the inputs of the respective send gates to the outputs of the respective receive gates corresponding thereto. An individual low-pass filter having its input coupled to the output of each receive gate integrates the amplitude-modulated pulses applied thereto to thereby reproduce at the output of each low-pass filter the analog signal applied to the input of the send gate corresponding thereto.

It will be seen that during each successive time frame, amplitude-modulated pulses originating at each independent analog signal source are sequentially transmitted over the common transmission highway during the successive time slots composing each time frame. Since the common transmission highway unavoidably must have a certain reactance, it has been found that a small residual signal is stored by the common transmission highway at the end of each time slot which is proportional to the amplitude of the amplitude-modulated pulse sample occupying that time slot. These residual signals cause unwanted crosstalk to take place, since successive analog signals transmitted are independent of each other so that there is no relationship between the amplitude of an amplitude-modulated pulse sample transmitted during any one time slot and the amplitude of the amplitude-modulated pulse sample transmitted during the next succeeding time slot. If the time slots are relatively long, only a minor problem is created. However, when the duration of a time slot approaches one microsecond or less, the problem of crosstalk becomes very significant.

One method utilized by the prior art to minimize this unwanted crosstalk is to transmit each amplitude-modulated pulse sample only during a first portion of the time slot it occupies, utilizing the remaining latter portion of each time slot as a guard period. During each guard period the common transmission highway is clamped to a point of fixed potential, such as ground. This permits substantially all of the residual signal then stored on the common transmission highway to be dissipated during that guard period, so that at the initiation of the next occurring sample any remaining residual signal from the previous sample is of negligible amplitude.

Since even the best of clamp circuits has a certain resistance which limits the discharge time constant of the common transmission highway, the guard period must have at least a certain minimum duration if clamping is to be effective in eliminating unwanted crosstalk. The fact that this is so limits the number of time slots into which a given time frame may be divided, thereby limiting the number of independent communications which may be transmitted over a common transmission highway.

The present invention departs from conventional time division multiplex communication systems in that in the present invention the send and receive gates associated with any one communication are opened only if a signal to be communicated is present, rather than during a particular time slot of a repetitive time frame, and then at a variable frequency which fulfills Nyquist's theorem, i.e., always at a rate higher than twice any signal frequency component. More particularly, in the present invention the time of occurrence of each successive sample of any signal being communicated is a function of the instantaneous frequency and phase of that signal. Since the respective signals transmitted over a time division multiplex communication system are independent from each other, it will be seen that sampling of the respective signals will occur in an essentially random fashion.

Since sampling occurs in an essentially random fashion in the present invention, it is possible for two or more independent signals to be sampled simultaneously, the probability of such simultaneous sampling being a function of the average number of samples being transmitted per unit time and the time duration of each individual sample. Such simultaneous transmission of samples creates a problem in the present invention, since the simultaneous transmission of samples results in only the transmission of noise, rather than signal information. This problem can be somewhat mitigated by blocking the transmission of any sample in response to the occurrence of two or more simultaneous samples. Although this prevents the transmission of this noise, it still results in the loss of the information contained in any of these simultaneously occurring samples. However, due to the inherent redundancy existing in most signals being communicated and depending on the desired fidelity of the received communication, a probability rate between one and five percent of simultaneously occurring samples can be tolerated without any loss in the communication of essential information.

The fact that in the present invention no sampling takes place unless a signal to be communicated is actually present, that the sampling which does take place is essentially random and that a probability rate of between one and five percent in simultaneously occurring samples can be tolerated, means that a significantly greater amount of information may be communicated per unit time over a common transmission highway than is possible with the conventional type of time division multiplex communication system discussed above. This greater amount of information may take the form of either an increase in the number of signal channels, an increase in the signal channel bandwidth, or a combination of both of these.

In addition to these advantages, the present invention has the advantage that it is not handicapped by the problem of crosstalk. The reason for this is that the essentially random occurring signal samples result in any remaining residual signals on the common transmission highway occurring aperiodically, rather than periodically. Such aperiodically occurring residual signals will to a certain extent cancel each other and to the extent that they are not cancelled will result to a small degree only in creating a noise background, rather than crosstalk. However, this noise background is of a low level and creates no problem.

It is therefore an object of the present invention to provide a time division multiplex communication system wherein each of one or more analog signals to be transmitted is sampled only when that signal is present and then at a variable frequency which is more than twice as high as the highest frequency component of that signal at a rate which is a function of the instantaneous frequency and phase of that signal to be transmitted.

Briefly, this may be accomplished by modulating a carrier frequency of a value higher than the highest frequency component of a signal to be transmitted with the signal itself, filtering out the upper sideband of this signal-modulated carrier, and opening send and receive gates individual to the communication of that signal to permit communication of that signal in response to each cycle of the aforesaid upper sideband.

This and other objects, features and advantages of the present invention will become more apparent from the following detailed description taken together with the accompanying drawing in which the sole figure illustrates a block diagram of a preferred embodiment of the present invention.

Referring to the drawing, there is shown a plurality of voice frequency signal sources 100–1 . . . 100–N and a plurality of data frequency signal sources 102–1 . . . 102–M. Each of voice frequency signal sources 100–1 . . . 100–N, which may be, for instance, a telephone channel, is a relatively narrow-band signal source providing a signal to be transmitted having an upper frequency of 4 kilocycles, for instance. On the other hand, each of data frequency signal sources 102–1 . . . 102–M is a relatively wide-band signal source providing a signal to be transmitted having an upper frequency of 40 kilocycles, for instance.

Associated with each voice frequency signal source 100–1 . . . 100–N is a corresponding voice frequency send modem 104–1 . . . 104–N and associated with each data frequency signal source 102–1 . . . 102–M is a corresponding data frequency send modem 106–1 . . . 106–M.

Each of voice frequency send modems 104–1 . . . 104–N and each of data frequency send modems 106–1 . . . 106–M include, as shown in detail for voice frequency send modem 104–1, an input transformer, such as input transformer 108–1, having a primary winding, such as primary winding 110–1, and two secondary windings, such as secondary winding 112–1 and secondary winding 114–1. Further included in each send modem are a low-pass filter, such as low-pass filter 116–1, a modulator, such as modulator 118–1, a high-pass filter, such as high-pass filter 120–1, an amplifier, such as amplifier 122–1, a blocking oscillator, such as blocking oscillator 124–1, and a gate, such as gate 126–1.

Associated in common with all of voice frequency send modems 104–1 . . . 104–N is carrier frequency oscillator 128, which generates a constant frequency signal $f_{c1}$ which is higher than the highest frequency component of any voice frequency signal source. The frequency $f_{c1}$ of carrier frequency oscillator 128 may be 5 kilocycles, for instance. Associated in common with all of data frequency send modems 106–1 . . . 106–M is carrier frequency oscillator 130, which generates a constant frequency signal $f_{c2}$ which is higher than the highest freqency component of any data frequency signal source. The frequency $f_{c2}$ of carrier frequency oscillator 130 may be 50 kilocycles, for instance.

The only difference between each of the voice freqency send modems 104–1 . . . 104–N and each of the data frequency send modems 106–1 . . . 106–M is the respective cut-off frequencies of the low-pass filters and high-pass filters thereof. For reasons which will become apparent below, the cut-off frequency of the low-pass filter of each of voice frequency send modems 104–1 . . . 104–N is just above the highest voice frequency component, such as just above 4 kilocycles, for instance; while the cut-off frequency of the high-pass filter thereof is slightly above the frequency $f_{c1}$ of carrier frequency oscillator 128, such as slightly above 5 kilocycles, for instance. In the case of each of data frequency send modems 106–1 . . . 106–M, the cut-off frequency of the low-pass filter of each of data frequency modems 106–1 . . . 106–M is just above the highest data frequency component, such as just above 40 kilocycles, for instance; while the cut-off frequency of the high-pass filter thereof is slightly above the frequency $f_{c2}$ of carrier frequency oscillator 130, such as slightly above 50 kilocycles, for instance.

As shown, in the case of voice frequency send modem 104–1, the analog signal from voice frequency signal source 100–1 is applied as an input to primary winding 110–1 of input transformer 108–1, resulting in a first induced analog signal in secondary winding 112–1 of input transformer 108–1 being applied through low-pass filter 116–1 to gate 126–1, which is normally closed. A second induced analog signal appearing on secondary winding 114–1 of input transformer 108–1 is applied as an input to modulator 118–1. The carrier frequency $f_{c1}$ is applied as a second input to modulator 118–1. Modulator 118–1, which may be either a balanced or unbalanced amplitude modulator, but is preferably a balanced amplitude modulator, produces as an output a lower sideband equal to the instantaneous difference between the carrier frequency $f_{c1}$ and the instantaneous frequency of the analog signal from signal source 100–1, an upper sideband equal to the sum of the carrier frequency $f_{c1}$ and the instantaneous frequency of the analog signal from signal source 100–1, as well as a certain amount of the carrier frequency $f_{c1}$ itself. If modulator 118–1 is of the balanced type, the carrier frequency $f_{c1}$, per se, will be suppressed and therefore of very low magnitude.

The output of modulator 118–1 is applied through high-pass filter 120–1, which passes only the aforesaid upper sideband, eliminating the lower sideband as well as the carrier frequency $f_{c1}$ itself. It now will be seen that the reason why a balanced modulator is preferable over an unbalanced modulator is that a simpler filter may be utilized to eliminate the carrier frequency $f_{c1}$ if a balanced modulator, rather than an unbalanced modulator, is utilized.

Since the frequency $f_{c1}$ of carrier frequency oscillator 128 is, as described earlier, higher than the highest frequency component of the analog signal from signal source 100–1, the sum of the carrier frequency $f_{c1}$ and the highest frequency component of the analog signal from signal source 100–1 which may be present in the upper sideband output of high-pass filter 120–1 is and must be higher than twice the highest frequency component of the analog signal from signal source 100–1. A fortiori, the upper sideband frequency derived from an analog signal component of signal source 100–1 which is lower than the highest frequency component is and must be more than twice the frequency of that component. Therefore, all frequency components of the upper sideband output of high-pass filter 120–1 are and must be higher than twice the frequency components from signal source 100–1 from which they are respectively derived, i.e., they fulfill the requirements of Nyquist's theorem.

The output of high-pass filter 120–1, which is solely the upper sideband generated by modulator 118–1, is amplified by amplifier 122–1 and is applied as an input to blocking oscillator 124–1. Blocking oscillator 124–1, in response to each individual cycle included in the upper sideband output of high-pass filter 120–1, generates a short sample pulse of given duration, such as 0.4 microseconds, for instance. This short sample pluse is applied to gate 126–1 to effect the opening thereof for the duration of each pulse. This permits a sample of the analog signal applied to gate 126–1 from low-pass filter 116–1 to be applied to common transmission highway 132.

In a similar manner, each of the other voice frequency send modems, such as voice frequency send modem 104–N, applies samples of the analog signal produced by the signal source with which it corresponds, such as voice frequency signal source 100–N, to common transmission highway 132.

Except for the higher operating frequencies of the data frequency signal sources 102–1 . . . 102–M, carrier frequency oscillator 130 and the low-pass filter and high-pass filter included in each of data frequency send modems 106–1 . . . 106–N, data samples derived from each of the data signal frequency sources are applied to common transmission highway 132 in essentially the same manner as the voice frequency samples derived from the voice frequency signal sources, described above.

As shown in the figure, the preferred embodiment of the invention includes a plurality of receive modems 134–1 . . . 134–S, each of which, as shown for receive modem 134–1, consists of a gate, such as gate 136–1, which is normally closed feeding a low-pass filter, such as low-pass filter 138–1. A certain portion of the group of receive modems 134–1 . . . 134–S are reserved for receiving voice frequency communications, while the remaining portion of the group of receive modems 134–1 . . . 134–S are reserved for receiving data frequency communications. The only difference between a receive modem reserved for receiving a voice frequency communication and a receive modem reserved for receiving a data frequency communication is that the low-pass filter of the former has a cut-off frequency just above the highest frequency component of a voice frequency communication, such as just above 4 kilocycles, while the low-pass filter of the latter has a cut-off frequency just above the highest frequency component of the data frequency communication, such as just above 40 kilocycles.

The output of the blocking oscillator of each send modem is applied, as shown, over an individual corresponding one of the conductors 136–1 . . . 136–N and 138–1 . . . 138–M as an individual input to coincidence detector 140. Coincidence detector 140 includes normally open gating means for normally connecting corresponding ones of individual conductors 136–1 . . . 136–N and 138–1 . . . 138–M to individual ones of corresponding conductors 142–1 . . . 142–N and 144–1 . . . 144–M. So long as one, and only one, blocking oscillator at any time applies a sample pulse as an input to coincidence detector 140, the normally open gating means thereof will remain open. However, whenever two or more blocking oscillators simultaneously apply inputs to coincidence detector 140, the gating means thereof is closed so that none of these simultaneously applied sampled pulses is passed by coincidence detector 140 to the corresponding one of conductors 142–1 . . . 142–N or 144–1 . . . 144–M.

Conductors 142–1 . . . 142–N and 144–1 . . . 144–M are applied, as shown, as inputs to crosspoint matrix steering circuit 146. Crosspoint matrix steering circuit 146, in accordance with address information supplied thereto by address steering control circuit 148, interconnects each individual one of conductors 142–1 . . . 142–N 144–1 . . . 144–M to individual selected ones of conductors 150–1 . . . 150–S, each of which controls the gate of that one of the receive modems with which it corresponds, as shown. Thus, conductor 150–1, which may be selectively interconnected with any of conductors 142–1 . . . 142–N in accordance with address information from address steering control circuit 148, is effective in opening gate 136–1 of receive modem 134–1 in response to a sample pulse from a blocking oscillator of a voice frequency send modem forwarded thereto, while conductor 150–S, which may be selectively interconnected with any one of conductors 144–1 . . . 144–M in accordance with address information from address steering control circuit 148, is effective in opening the gate of receive modem 134–S in response to a sample pulse from a blocking oscillator of a data frequency send modem forwarded thereto.

As shown in detail for receive modem 134–1, each of the receive modems has a sample from common transmission highway 132 applied as an input thereto. Therefore, so long as simultaneously occurring sample pulses from the respective blocking oscillators of the send modems do not take place, the gate of a receive modem will be opened simultaneously with the opening of the gate of that send modem with which it is in communication, resulting in the sample which is applied to the common transmission highway from that send modem being forwarded through the gate of that receive modem to the input of the low-pass filter thereof. The low-pass filter of each receive modems integrates the individual successive samples applied to the input thereof to reproduce at its output the analog signal originally applied to the input of that send modem with which it is in communication.

As stated above, it is not desirable that simultaneously occurring samples from two different communications be permitted, since this results in unwanted noise being produced at the received output. For this reason, in the preferred embodiment of the present invention just described, coincidence detector 140 has been included. However, in those cases where this unwanted noise can be tolerated, coincidence detector 140 may be omitted and conductors 136–1 . . . 136–N and 138–1 . . . 138–M may be connected directly to the inputs of crosspoint matrix steering circuit 146.

Although only a preferred embodiment of the invention has been described herein, it is not intended that the invention be restricted thereto, but that it be limited only by the true spirit and scope of the appended claims.

What is claimed is:

1. In a time division multiplex communication system comprising transmission means including normally closed gate means, first means for applying an analog signal having a maximum frequency component less than a predetermined frequency as an input to said transmission means, a low-pass filter having a cut-off frequency equal to said predetermined frequency, and second means for applying the output of said transmission means only when said gate means thereof are open as an input to said filter; the combination therewith of third means responsive to the instantaneous frequency and phase of said analog signal for momentarily opening said gate means only if said analog signal is present and then at a variable rate determined in accordance with a given function of the instantaneous frequency and phase of said analog signal which determined rate is always more than said predetermined frequency and more than twice the highest frequency then present of said analog signal.

2. The system defined in claim 1, wherein said first means includes an analog signal source and a low-pass third filter for passing frequencies up to the frequency of said maximum frequency component coupling the output from said source to the input of said transmission means.

3. The system defined in claim 1, wherein said transmission means includes a transmission highway and said gate means includes a normally closed send gate opened by said third means and effective when open for applying a sample of said analog signal to said highway and a normally closed receive gate opened by said third means simultaneously with the opening of said send gate for applying said sample to the input of said filter.

4. The system defined in claim 1, wherein said third means includes a carrier frequency oscillator for generating a carrier frequency greater than said predetermined frequency, a modulator coupled to said first means and said oscillator for amplitude modulating said carrier frequency with said analog signal, a second filter having its input coupled to the output of said modulator for passing only the upper sideband emanating therefrom, and fourth means coupled to said gate means and the output of said second filter for momentarily opening said gate means in response to each cyle of said upper sideband.

5. The system defined in claim 4, wherein said fourth means is a blocking oscillator.

6. The system defined in claim 4, wherein said modulator is a balanced modulator.

7. In a time division multiplex communication system comprising a common transmission highway, a plurality of independent analog signal sources, an individual normally closed send gate corresponding with each source, individual first means corresponding with each source for applying an analog signal from the source with which it corresponds to the input of that send gate which corresponds with that source, second means for coupling the output of each send gate to said highway for applying an analog signal sample from each source to said highway in response to the send gate corresponding thereto being open, the analog signal applied to the send gate corresponding to at least one of said sources having a maximum frequency component less than a predetermined frequency, a plurality of low-pass filters, at least one of said low-pass filters having a cut-off frequency equal to said predetermined frequency, and an individual normally closed receive gate corresponding with each low-pass filter effective when open for coupling said highway to the input of the low-pass filter with which it corresponds; the combination therewith of third means responsive to the instantaneous frequency and phase of the analog signal from at least said one of said sources for momentarily opening said send gate corresponding to said one of said sources and said receive gate corresponding to said one of said low-pass filters simultaneously only if the analog signal from said one of said sources is present and then at a variable rate determined in accordance with a given function of the instantaneous frequency and phase of the analog signal from said one of said sources which determined rate is always more than said predetermined frequency and more than twice the highest frequency then present of the analog signal from said one of said sources.

8. The system defined in claim 7, wherein said third means includes a carrier frequency oscillator for generating a carrier frequency greater than said predetermined frequency, a modulator coupled to said one of said sources and said oscillator for amplitude modulating said carrier frequency with the analog signal from said one of said sources, a modulator filter having its input coupled to the output of said modulator for passing only the upper sideband emanating therefrom, and fourth means coupled to said send gate corresponding to said one of said sources, said receive gate corresponding to said one of said low-pass filters and said modulator filter for momentarily opening simultaneously that send gate and receive gate in response to each cycle of said upper sideband from said modulator filter.

9. The system defined in claim 8, wherein each of the respective analog signals applied to the respective send gates corresponding to certain ones of said sources has a maximum frequency component less than said predetermined frequency, wherein each of certain ones of said low-pass filters has a cut-off frequency equal to said predetermined frequency, wherein said third means includes an individual modulator corresponding to each of said certains ones of said sources which is coupled to the source with which it corresponds and to said oscillator, an individual modulator filter corresponding to each modulator and having its input coupled to the output of the modulator with which it corresponds for passing only the upper sideband emanating therefrom, and wherein said fourth means includes correlation means for correlating each one of said send gates corresponding to said certain ones of said sources with at least one of said receive gates corresponding to said certains ones of said low-pass filters, and means coupling the modulator corresponding to each of said certain ones of said sources to that send gate corresponding thereto and to that receive gate correlated with that send gate for momentarily opening simultaneously that send gate and receive gate in response to each cycle of the upper sideband emanating from that modulator.

10. The system defined in claim 9, wherein said correlation means includes steering means controlled by address information supplied thereto for selectively correlating any of said receive gates corresponding to said certain ones of said low-pass filters with any of said send gates corresponding to said certain ones of said sources.

11. The system defined in claim 9, wherein said correlation means includes coincidence means responsive to the simultaneous opening of more than one of said send gates for preventing the opening of any of said receive gates so long as said simultaneous opening of said send gates persists.

12. The system defined in claim 7, wherein the analog signal applied to the send gate corresponding to another of said sources has a maximum frequency component less than a second predetermined frequency different from said first-mentioned predetermined frequency, wherein another of said low-pass filters has a cut-off frequency equal to said second predetermined frequency, and wherein said third means is also responsive to the instantaneous frequency and phase of the analog signal from said other of said sources for momentarily opening said send gate corresponding to said other of said sources and said receive gate corresponding to said other of said low-pass filters simultaneously only if the analog signal from said other of said sources is present and then at a second variable rate determined in accordance with a second given function of the instantaneous frequency and phase of the analog signal from said other of said sources which second determined rate is always more than said second predetermined frequency and more than twice the highest frequency component then present of the analog signal from said other of said sources.

13. The system defined in claim 12, wherein said third means includes a first carrier frequency oscillator for generating a first carrier frequency greater than said first-mentioned predetermined frequency, a first modulator coupled to said one of said sources and said first oscillator for amplitude modulating said first carrier frequency with the analog signal from said one of said sources, a first modulator filter having its input coupled to the output of said first modulator for passing only the upper sideband emanating therefrom, fourth means coupled to said send gate corresponding to said one of said sources, said receive gate corresponding to said one of said low-pass filters and said first modulator filter for momentarily opening simultaneously that send gate and receive gate in response to each cycle of said upper sideband from said first modulator filter, a second carrier frequency oscillator for generating a second carrier frequency greater than said second predetermined frequency, a second modulator coupled to said other of said sources and said second oscillator for amplitude modulating said second carrier frequency with the analog signal from said other of said sources, a second modulator filter having its input coupled to the output of said second modulator for passing only the upper sideband emanating therefrom, and fifth means coupled to said send gate corresponding to said other of said sources, said receive gate corresponding to said other of said low-pass filters and said second modulator filter for momentarily opening simultaneously that send gate and receive gate in response to each cycle of said upper sideband from said second modulator filter.

References Cited

UNITED STATES PATENTS

| | | | |
|---|---|---|---|
| 2,719,188 | 9/1955 | Pierce | 179—15 |
| 3,006,991 | 10/1961 | Cherry et al. | 179—15.55 |
| 3,299,204 | 1/1967 | Cherry et al. | 178—6 |

JOHN W. CALDWELL, *Acting Primary Examiner.*

ROBERT L. GRIFFIN, *Examiner.*